(No Model.)
J. LINDSAY.
CARRIAGE WHEEL.
No. 588,682. Patented Aug. 24, 1897.
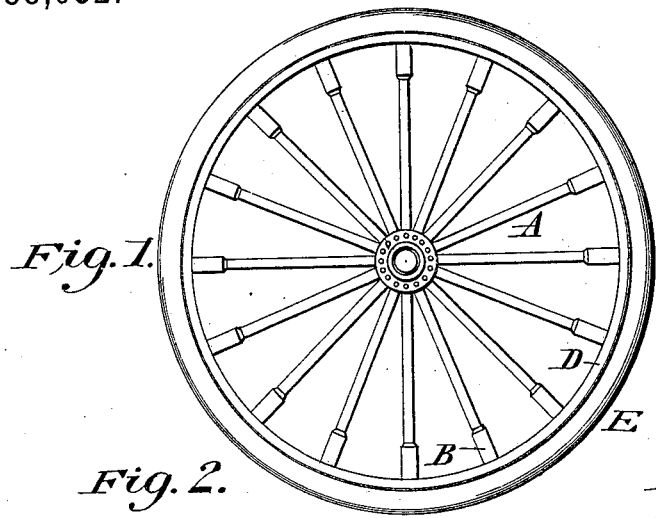
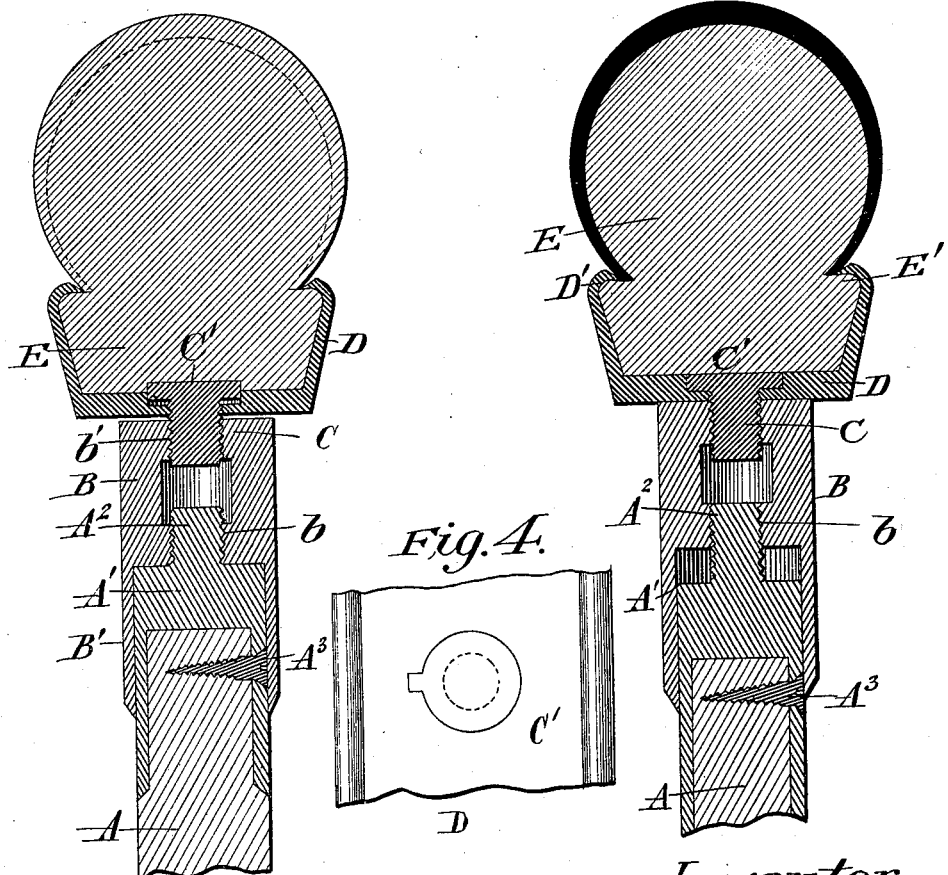
Witnesses.
M. F. Boyle
J. B. Clautice
Inventor.
Joseph Lindsay
By Thomas Drew Stetson
Attorney
THE NORRIS PETERS CO., PHOTO-LITHO., WASHINGTON, D. C.

United States Patent Office.

JOSEPH LINDSAY, OF DUBLIN, IRELAND.

CARRIAGE-WHEEL.

SPECIFICATION forming part of Letters Patent No. 588,682, dated August 24, 1897.

Application filed August 19, 1896. Serial No. 603,237. (No model.)

*To all whom it may concern:*

Be it known that I, JOSEPH LINDSAY, a subject of the Queen of Great Britain and Ireland, residing at No. 2 Innisfallen Parade, Dublin, Ireland, have invented certain Improvements in the Construction of Wheels for Carriages and other Vehicles; and I do hereby declare that the following is a full, clear, and exact description of the invention, which will enable others skilled in the art to which it appertains to make and use the same.

The invention has reference to improvements in the construction of carriage-wheels for the reception of cushion or pneumatic tires, and is especially designed to facilitate the application of the rim direct to the spokes without the intervention of the ordinary wooden fellies.

In order that my said invention may be more readily understood and carried into practice, I will proceed to describe the same with the assistance of the accompanying drawings.

Figure 1 represents in elevation a complete wheel constructed according to my invention. The remaining figures show certain portions on a larger scale. Fig. 2 is a cross-section of the rim and a corresponding section of the outer end of a spoke and of the connecting means loosely connected ready to be tightened. Fig. 3 is a corresponding section showing the connection tightened and made very rigid. Fig. 4 is a plan view of a portion showing a modification.

Similar letters of reference indicate corresponding parts in all the figures where they appear.

A' is a cap composed of any suitable metal, which is firmly and permanently fixed to the end of the spoke A and held by means of a radial screw $A^3$ or otherwise, as may be found convenient. It is provided with a screw-threaded shank $A^2$.

B is a coupling which engages by a tubular extension B' with the smoothly-finished exterior of the cap A', with liberty to be revolved thereon. Its axial line is bored through and is peculiarly screw-threaded, the inner end of its axial hole being provided with quick threads $b$, matching to corresponding quick threads on the shank $A^2$, while the opposite (the outer) end is provided with slower threads $b'$, adapted to engage corresponding threads on a screw-bolt C, which performs important functions. Its squared head C' is adapted to sink into a corresponding shallow recess formed in a corresponding position in the metallic rim D. It will be understood that there is one of these couplings and bolts for each spoke and that the recesses in the rim hold the bolts firmly against being revolved while allowing them a little play endwise.

In applying the parts together, the spoke-frame being properly held, the rim D is pressed on over the ends of the couplings B and the bolts C are inserted loosely, managing by properly springing the parts to leave each bolt with its squared head slightly engaged in the corresponding recess in the rim, so that it will be held against revolution when the coupling is subsequently turned. The cushion-tire, or it may be a pneumatic tire, may be now applied and will contribute to hold the parts in their approximately correct positions notwithstanding the looseness which obtains at this stage. Next the several couplings B are turned either simultaneously or successively by increments, with the effect to move them outward, by acting on the quick screw-threads on the several shanks $A^2$ by the correspondingly quick threads $b$ in the couplings and pressing the outer ends of the couplings firmly against the corresponding adjacent surfaces on the inner face of the rim D. Gas-pipe tongs or other suitable appliances may be used in the last part of this movement to set the several couplings outward with force.

The parts should be so proportioned that when the couplings have been made to bear firmly outward against the inner face of the rim the several bolts C have been drawn inward just sufficiently to tighten them by the action of the slow screw-threads $b'$ in the couplings on the corresponding slow threads on these bolts.

The tubular extensions B' should be sufficiently strong and long to maintain a true hold on the exterior of the cap A' on each spoke, notwithstanding the considerable end movement of the couplings in the act of setting the wheel.

By this arrangement it is obvious that the present method of applying rims to wheels—namely, the necessity of dishing or contracting the spoke-frame—is entirely dispensed with and a wheel of a firm and durable construction is produced.

Modifications may be made without departing from the principle or sacrificing the advantages of the invention. Instead of making the heads C' of the bolts C square they may be circular with a key or projection at one point to engage with a corresponding recess in the side of the conical or countersunk hole in the rim. Fig. 4 shows in plan such a modification with the tire omitted.

The screw-threads on the bolt C may be of the same pitch as the screw-threads on the shank $A^2$, taking care that the screw-threads $b$ and $b'$ are made to correspond. In such case the movement of the bolt C inward will be greater and there must be a corresponding increase of looseness of the parts in applying them together.

The screw-threads on the bolt C may be left-hand, while the screw-threads on the shank $A^2$ are right-hand, care being taken to properly operate; but I prefer the construction and operation described.

I claim as my invention—

1. A wheel comprising a rim D, adapted to receive a yielding tire, a series of threaded bolts C, non-revoluble relative to the rim and projecting at the inner side of the same, in combination with the spokes A, each having a fixed cap A', provided with a threaded shank $A^2$, and a coupling B, screw-threaded to engage a bolt and shank and turn on both to effect the spreading of the spoke and rim while the bolt is held against rotation, substantially as set forth.

2. A wheel comprising a rim D adapted to receive a yielding tire, spokes A having each a cap A' with a screw-threaded extremity, and a coupling B correspondingly screw-threaded and having a tubular inner end B' matching upon and strongly guided upon the spoke but capable of being moved endwise thereon, in combination with the bolt C, C', engaging the outer end of the coupling by a different screw-thread, adapted to tighten the entire connection of the spokes and rim as required, substantially as herein specified.

Dated this 25th day of July, 1896.

JOSEPH LINDSAY.

Witnesses:
ANGELO FAHIE,
J. M. MURRAY.